United States Patent Office 3,433,713
Patented Mar. 18, 1969

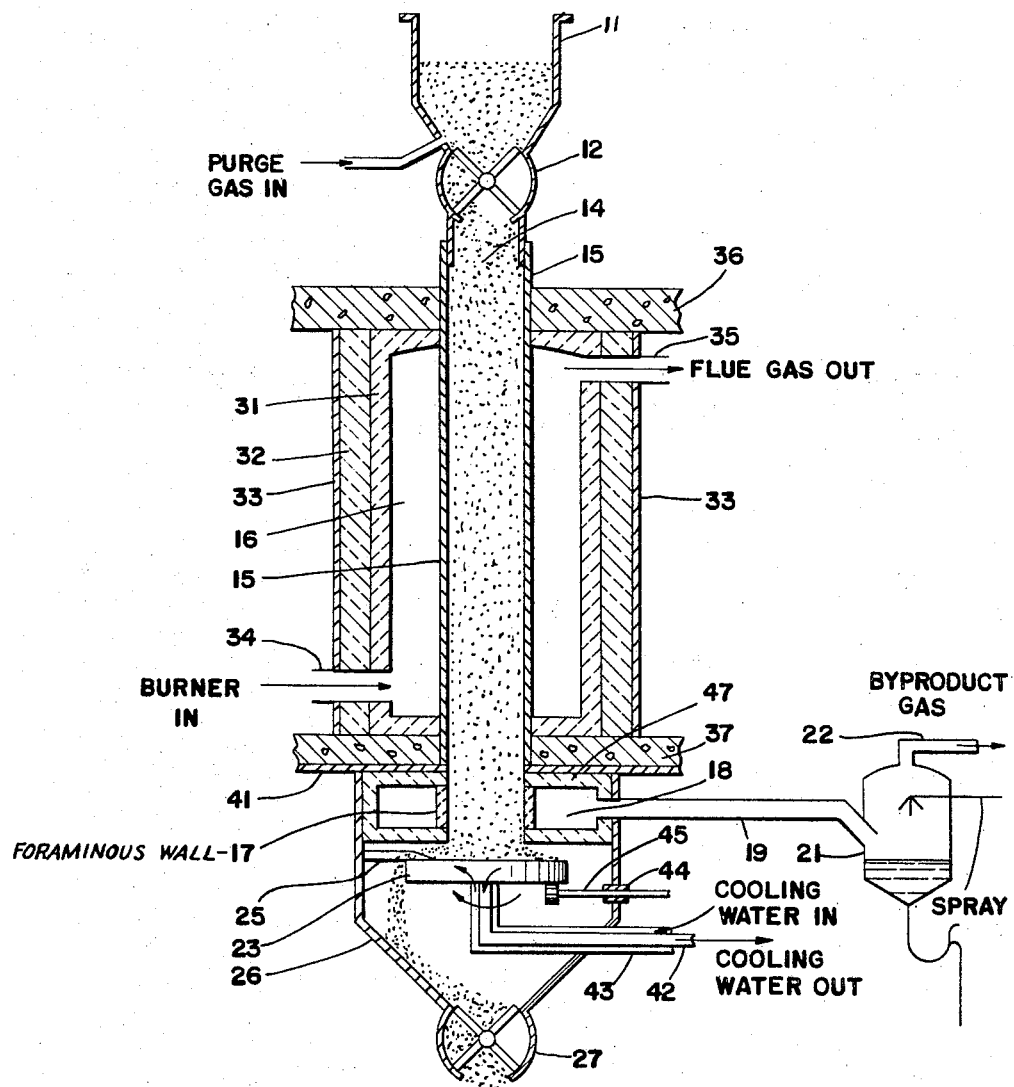

3,433,713
GRAVITY-FLOW CALCINER AND PROCESS FOR CALCINING CARBONACEOUS SOLIDS
Hugh T. Reid, 13875 Lake Ave., Lakewood, Ohio 44107
Filed June 23, 1965, Ser. No. 466,292
U.S. Cl. 201—34    7 Claims
Int. Cl. C10b 47/18, 47/00

ABSTRACT OF THE DISCLOSURE

Particulate, substantially dry carbonaceous solids feed such as anthracite coal and petroleum coke containing upwards to about 20% volatile matter is converted into industrial carbon products by calcining it in a columnar bed to a temperature of at least 1300° C., and drawing resulting gasiform distillate down through the bed through the hottest bed section for discharge therebelow. The calciner for this purpose comprises a stationary shaft with an upper, substantially non-porous section and a lower foraminous wall section, an indirect heater, a chamber communicating with the foraminous wall section and exhauster means for drawing resulting gasiform products through the foraminous wall to discharge same from the system, a product cooler, and feed and expeller means for loading and unloading the calciner while maintaining substantial exclusion of air from contact with the hot carbonaceous solids in process.

---

This invention relates to a gravity-flow calciner and to a process for calcining particulate carbonaceous solids feed containing distillable volatile matter.

Heretofore, it has been proposed to calcine a bed of carbonaceous solids at a reduced pressure to lower the volatilizing temperature, to use vacuum to pull gases from the top of a calciner, to do a partial burning of combustible calcining solids, to use indirect heating, to mechanically propel the bed, and to rotate the calcining tube. In some cases such proposals have been devised to induce a flow of solids through the apparatus, which solids otherwise would tend to agglomerate and to block the apparatus, particularly when the carbonaceous feed is in extremely finely-divided state. However, certain difficulties in calcining fine carbonaceous materials, such as petroleum coke from fluid bed coking operations or coal fines, make many efforts toward agitation and gas-solids contact wasteful, expensive, or impractical.

Advantages of my invention over previously-proposed apparatus and processes in this field, particularly for calcining particulate carbonaceous solids, include compactness, capacity, versatility, and reliability of flow and of static mechanical members, particularly those subjected to the highest temperature of the operation.

Broadly my process comprises: establishing a columnar bed of said feed extending through an indirectly-heated calcining zone and having an upper bed portion and a lower bed portion; gradually withdrawing from the base of said bed a heat-treated solid particulate product that has reached temperature of at least about 1300° C.; replenishing the upper portion of said bed with cooler makeup feed, thereby instituting a temperature gradient from the top of said bed rising in the direction of the hottest bed section therebelow in said calcining zone; drawing resulting volatile matter distilled from said feed into contact with said hottest bed section; and thereafter withdrawing from said bed gasiform residue resulting from said contact.

Broadly my apparatus comprises: a stationary hollow shaft having an upper feed inlet and a lower product outlet, said shaft being an upper, substantially non-porous column adjoining at least one portion of lower foraminous wall section; an indirect heater for said column; a chamber outside of and in communication with said portion of foraminous wall; and an exhauster for establishing total pressure in said chamber below that of the interior of said shaft and passage of gasiform material through said portion of foraminous wall.

The drawing shows a schematic design elevation of a nominally 15-ton per day calcining unit designed in accordance with my invention principles. Operation of the unit is further described specifically in connection with Example 3.

Item 11 of the drawing is a feed hopper purged lightly with dry, oxygen-free gas (e.g., nitrogen) inert to the feed solids contained in the hopper. Feed solids are fed to calciner bed 14 by star feeder 12, driven by means not shown. The bed is held in essentially vertical position by refractory tube 15, and the tube is surrounded by firebox 16. Below tube 15 is foraminous member 17 concentric with tube 15 and continuing the passage of bed therethrough. Foraminous member 17 is surrounded annularly with chamber walls 47 forming chamber 18 on the outside of the porous member. Communicating with chamber 18 is line 19 leading to spray cooler 21. Cooler 21 is vented by line 22 leading to the suction of a compressor, not shown.

Item 23 is a rotary internally water-cooled table, power-driven by gear drive 45 entering through stuffing box 44 in the wall of hopper 26. Cooling water enters interior line 42, flows into the rotary table through a rotary joint, not shown, and exits from the table through a rotary joint, not shown, leading to cooling water outlet line 43 disposed annularly about the cooling water inlet line. Item 25 is a scalper or doctor knife scraping cooled solids from the table and dropping them down into hopper 26 from which they are expelled to storage by star feeder 27.

Firebox 16 is heated with a gas burner entering at inlet 34. Flue gases are withdrawn from outlet 35. Firebox walls 31 are high temperature refractory insulated on the sides with thermal insulation 32 and jacketed with metal shell 33. The top and bottom of the firebox are protected with reinforced, refractory concrete such as calcium aluminate concrete, items 36 and 37 respectively. Support plate 41 is disposed beneath reinforced concrete slab 37, and from the plate is suspended the hopper, the chamber walls, and the foraminous, bed-retaining member.

While my apparatus is useful for calcining particulate feeds generally, such as carbonaceous materials or carbonates, hydrates, sulfides, and the like, because of its particular design it is especially adapted for calcining fine carbonaceous solids for converting them into high quality carbon of low volatile content. By "carbonaceous solids" I mean to comprehend petroleum coke, anthracite coal, bituminous coal, lignites, chars, and the like. Because the volatile materials are drawn over the hottest part of the bed and pumped out of the system through a formainous member of finite and generally restricted size, the preferred feeds for efficiency and economy are those that have maximum volatile content not exceeding about 20% by weight to produce a high quality industrial carbon product useful for making fillers, moulded parts, etc. Volatile material and moisture content of carbonaceous feed is determined by the ASTM Standard Method (D271–58) for sampling and analysis of coal and coke.

I find it advantageous to use petroleum coke, such as that from a fluidized bed coking operation of residual petroleum stocks, and relatively small-sized anthracite coal as the finely-divided carbonaceous feeds, that is, those having particle size below about ¼" mesh. These are best adapted to my process and apparatus because of the difficulty in handling them in nearly any other way to get calcining efficiency and economy in view of their small particle size and their comparatively low density. Calcination of such carbonaceous material to a temperature of at least about 1300° C. and preferably 1350–1650° C. renders the resulting carbon residue eminently suitable for industrial use. Broadly those materials needing indirect heat for calcination such as carbonaceous feeds are well adapted for my invention because the heat is truly indirect in the sense that flames or hot combustion gases are not in direct contact with the bed particles.

The dryness of a particular carbonaceous feed is of importance also. If a significant proportion of water, e.g., 10–15%, is present based on such feed, it is very likely at some of the high temperatures possible with my apparatus and process to decompose the water in the presence of carbon to yield carbon monoxide and hydrogen to the detriment of yield and the safety of calcination, as well as putting a greater volatile load on the apparatus. Hence, fairly dry, e.g., pre-dried, feeds are the best for my purpose. Pretreatment of volatile carbonaceous feeds to dry them and distill off some loosely-bound volatiles often is desirable.

The volatiles being drawn across the hottest portion of the bed will tend to crack if they are of a hydrocarbon or related organic structure having hydrogen-carbon and carbon-carbon linkages (as is encountered with the volatiles of coal and petroleum coke); what is drawn out of the apparatus is a gasiform residue from such contact. Thus, additional carbon can be "made" desirably in accordance with my process. Furthermore and especially, these sometimes tar-like distillates are removed from the lower part of the bed and can be further rendered innocuous by this conversion, thereby preventing them from causing lumps or agglomerates of bed particles to form and plug up bed flow in the apparatus—as can happen otherwise when such volatiles ascend towards the top of the apparatus and into undiluted contact with cooler feed and vessel walls. Additionally, some volatile materials having silica and like content can distill off desirably in my process.

The heart of my apparatus is the foraminous wall section disposed below the hottest zone of the shaft. It can be situated below the firebox or surrounded by a portion of the firebox, if desired. My preferred porous walls for strength with good gas flow capacity are those formed with porous aluminum oxide about 1" thick and having a permeability of 80 or more, e.g., 80–130, standard cubic feet of air per minute per square foot of cross sectional area with a pressure drop not exceeding about 2" of water. Other refractory foraminous members can, of course, be made from wire mesh or wire wool or refractory fiber sufficiently resistant to withstand the highest temperatures of the calcining operation without losing structural integrity for their filtration purpose (of maintaining bed particles in the bed and passing gasiform residue to the outside of the shaft unit under a slight suction).

While in my operation a suction is normally used for sustained operation, I can also use a pulsation of gas flow through the bed where necessary or desirable by reversing the flow of gasiform residue being withdrawn from near the base of the unit to propel gases upward, then pull them downward in alternating fashion in the bed. Additionally, I can recycle at least a portion of the gasiform residue withdrawn from the unit (then preferably dried) to the top of the unit to apply a slight positive pressure at that point down through the bed. Such techniques are useful where the feed tends to cake or plug the unit and to loosen up or propel otherwise densely-packed beds for better flow properties. In the event that the unit becomes virtually plugged with carbonaceous material I can, of course, keep the shaft hot and admit air in a controlled fashion to burn the plug. The volatiles from the unit can also, of course, be recovered for fuel and used in the firebox or elsewhere if they have fuel value.

While electric heat can be used for my indirect heating, I find it advantageous to use a gas flame burning with oxygen or air, preferably air for efficiency and economy. While I have shown my units herein with a single shaft, it should be apparent that a number of shafts in parallel or in series can be used for calcining simultaneously or in stages. In the case of parallel flow shafts, a number of them can be jacketed by and heated in the same firebox for fuel economy and be fed by the same or different hoppers and cooled by the same or different indirect coolers. Bore diameter of my shafts advantageously is limited to about 12" to transfer heat reasonably rapidly at attractive throughput. Of course the shafts can be larger or smaller and have cross-section other than circular, e.g., square, rectangular, hexagonal, oval, etc.

The materials of construction are the common ones useful for withstanding high temperature and being substantially inert towards the bed, e.g., refractories of aluminum oxide, zirconia, magnesia, and the like. Where carbonaceous feed is in contact with the refractory, I prefer to use alumina. Refractories containing substantial silica content can contaminate a carbonaceous feed to some extent and thus are usually avoided in calcining carbon. Metal parts, such as the support plate 41, that are near to or exposed to very high temperatures are best water-cooled or air-cooled, e.g., by internal channeling or by conduction to cooler areas. Joints for allowing for differential expansion of the various components of the apparatus are provided according to good engineering principles where necessary or desirable.

The unit preferably is vertical for best flow to keep the maximum full bed without allowing gas to short circuit. However, almost any inclination of the tube can be used provided that the particles forming the bed therein will flow by gravity at that inclination. As a practical matter, inclinations of 10–15° from the vertical are quite satisfactory but are structurally weaker than the substantially vertical unit.

Exhaust of gasiform residue from the chamber generally is provided by a positive suction means, e.g., a compressor, a pump, a fan, a water aspirator, a steam jet exhauster or the like. "Hytor"-type compressors or disintegrator gas washers can both cool and scrub the gasiform residue while withdrawing it positively so as to create a slightly reduced pressure in the chamber. Alternatively, the tube can be maintained at a pressure above that of the chamber by supplying the tube with innocuous gas as well as feed solids, e.g., scrubbed dry residue gas.

The following examples show ways in which my invention can be practiced, but are not to be construed as limiting the invention. All temperatures indicated are in degrees centigrade, and all percentages weight percentages unless otherwise expressly specified.

Example 1

The experimental calcining unit is basically a vertical 6" I.D. x 8" O.D. substantially impervious refractory alumina tube 12' high mounted above and concentrically with a 4" high porous refractory alumina ring of the same I.D. and O.D. The ring is the core of an otherwise substantially impervious refractory alumina chamber covering the top and bottom peripheries of the ring and running annularly about the outer wall of the ring at a distance of 2", thereby surrounding the ring on its outside. A pipe connects the interior of the chamber to a distant water jet aspirator discharging to sewer. Suction on the chamber is regulated manually between about 2″ and about 10″ of water pressure during aspiration.

An insulated firebox jackets 9½′ of the tube, there being about 1′ of the tube projecting above the firebox. The firebox is equipped with pyrometric inspection ports, a side-entering gas burner near its base, and a flue for vent of combustion gases at the side near its top.

The top of the tube and the bottom of the chamber central hole are equipped with hand-operated slide valves. The valves are blanketed with a slight positive pressure of nitrogen gas for purging and eliminating possible air leakage into the tube.

Feed to the unit is petroleum coke from a fluid bed coking process. The feed is in fine spheroidal form, 70% of which passes 70 mesh (U.S. Std. Sieve). Its volatile content is 9.11%, moisture 0.05%, and bulk density 57.5 lbs. per cubic foot.

Initially the unit is charged from the opened top, the top valve closed, aspiration from the chamber started, and gas heating of the tube started. At approximately half-hour intervals thereafter aspiration is temporarily discontinued while increments of about 16 lbs. of calcined carbon product are withdrawn through the bottom valve into quickly-sealable containers.

Product withdrawals are made up in volume by adding fresh feed to the top of the unit, after which the unit is valved closed and aspiration restarted.

After several hours of operation, measurements by optical pyrometer indicate that the tube wall near the base of the firebox has reached 1350° C., and, for practical purposes, the coke bed can be assumed to be at the same temperature at that altitude. Carbon product withdrawn thereafter until shutdown several hours later has real density of 1.96±0.2 and volatile matter of 0.08-0.1%. The flow of carbonaceous solids through the equipment during operation is free and uninterrupted by plugging, significant agglomeration, and the like.

Example 2

In a run similar to that of Example 1, a mixture of pea, rice, barley, and fines of anthracite coal is the feed. ("Pea" passes a ⁹⁄₁₆″ test mesh round and is held on ¼″, while "fines" pass ⅛"). The coal has volatile content of 6%. The desired calcined carbon product is obtained in several hours of operation. It is that material withdrawn from the unit when reaching about 1550° C., and it has less than 0.1% volatile matter.

Example 3

The following is the basis of design for a nominally 15-ton per day calcining unit operating on the petroleum coke described in Example 1. Special reference is made to the drawing. Refractory tube 13 is 12 feet long and has a 12″ I.D. Ring 17 has fine, tortuous pores with sufficient porosity and area to pass 100 cubic feet per minute of hot gases at a pressure drop of 2-3″ of water.

Coke in feed hopper 11 is purged gently with oxygen-free gas to displace air. Purged, comparatively cool coke feeds through star feeder 12 continuously at a rate of 25.6 lbs. per minute and falls on the top of bed 14 that is moving downwardly in tube 15. Heat is supplied to the tube at the rate of about 2,000,000 B.t.u. per hour from a gas flame in firebox 16. The coke bed reaches 1350° C. at about the bottom of the firebox. Volatile materials occurring in the process and being expelled from the descending coke bed are drawn through this hottest zone, then the resulting gasiform residue passes through ring 17, into chamber 18, through line 19, and into spray pot 21. Here, these suction vapors are scrubbed and cooled with water, the waste of which water then drains to sewer. The cooled vapors ascend through outlet 22 to the suction of a compressor not shown; they can be used as auxiliary fuel or, when dried, as purge gas.

Also continuously 22.6 lbs. per minute of carbon calcinate flows out from the base of the porous ring section and onto rotary cooling table 23 where it is cooled to about 200°. The cooling load on the table is kept substantially constant by the continuous peripheral scraping of scalper or doctor blade 25. Cooled carbon product having volatile content below 0.1% and actual density about 1.96 falls onto product hopper 26 and is discharged to storage by star feeder 27 at a substantially constant rate about equal to accumulation.

I claim:

1. A process for calcining particulate, substantially dry carbonaceous solids feed selected from the group consisting of anthracite coal and petroleum coke, said feed containing distillable volatile matter which comprises:
   establishing a columnar bed of said feed extending through an indirectly-heated calcining zone and having an upper bed portion and a lower bed portion;
   in said bed distilling volatile matter from the particulate solids therein;
   gradually withdrawing from the base of said bed a heat-treated solid particulate carbon product that has reached temperature of at least 1300° C.;
   replenishing the upper portion of said portion with cooler makeup feed, thereby instituting a temperature gradient from the top of said bed rising in the direction of the hottest bed section therebelow in said calcining zone;
   drawing resulting volatile matter distilled from the particulate solids of said bed into contact with said hottest bed section;
   and thereafter withdrawing from said bed, at a gas withdrawal zone in proximity to said hottest bed section, gasiform residue resulting from said contact.

2. The process of claim 1 wherein said carbonaceous feed has volatile content not substantially above about 20% by weight and is no larger than about 2 cm. in its largest dimension.

3. The process of claim 1 wherein the feed is petroleum coke from a fluidized coking operation, and it is heat-treated in said calcining zone to reach a temperature of 1350-1650° C.

4. The process of claim 1 wherein the feed is anthracite coal, and it is heat-treated in said calcining zone to reach a temperature of 1350-1650° C.

5. A gravity-flow calciner comprising:
   a stationary hollow shaft having an upper feed inlet and a lower product outlet, said shaft being an upper, substantially non-porous column adjoining at least one portion of lower foraminous wall section;
   a feed hopper having an inlet for purging air from feed therein;
   a feeder disposed to accept purged feed from said feed hopper and to discharge same into said upper feed inlet, said feeder substantially excluding air from entry into said shaft;
   an indirect heater for said column;
   a chamber outside of and in communication with said portion of foraminous wall;
   an exhauster for establishing total pressure in said chamber below that of the interior of said shaft and passage of gasiform material through said portion of foraminous wall;
   a product cooler disposed to accept heated product discharge from said lower product outlet and to cool same;
   and a cooled product expeller disposed for accepting resulting cooled product from said product cooler, said expeller substantially excluding air from contact with hot product.

6. The calciner of claim 5 wherein said shaft is substantially vertical and said heater is disposed to heat said substantially non-porous column most intensely in a peripheral zone substantially below said upper feed inlet.

7. The calciner of claim 5 wherein said product cooler is a rotary, internally cooled table having drive means for imparting rotation thereto and a scalper for removing product accumulated therefrom, said expeller is a star valve, and said chamber discharges into cooler for gasiform material.

References Cited

UNITED STATES PATENTS

| | | | |
|---|---|---|---|
| 1,782,556 | 11/1930 | White | 201—34 XR |
| 2,276,343 | 3/1942 | Reyerson et al. | 201—34 XR |
| 2,626,235 | 1/1953 | Wilson | 201—34 |
| 3,185,635 | 5/1965 | Creglow | 201—32 XR |
| 3,316,155 | 4/1967 | Holowaty et al. | 201—34 XR |

NORMAN YUDKOFF, *Primary Examiner.*

DAVID EDWARDS, *Assistant Examiner.*

U.S. Cl. X.R.

202—117, 127